(12) United States Patent
Schmitt et al.

(10) Patent No.: US 7,380,434 B2
(45) Date of Patent: Jun. 3, 2008

(54) DEVICE FOR POSITIONING A COMPONENT PART IN AN INCLINED POSITION AND IMPACT TEST STAND HAVING SUCH A DEVICE

(75) Inventors: Gerold Schmitt, Zaberfeld (DE); Jörg Schöfer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 11/147,674

(22) Filed: Jun. 7, 2005

(65) Prior Publication Data

US 2006/0000306 A1 Jan. 5, 2006

(30) Foreign Application Priority Data

Jun. 16, 2004 (DE) .................. 10 2004 029 001

(51) Int. Cl.
*G01M 7/00* (2006.01)
*G01N 3/30* (2006.01)
*G01N 3/32* (2006.01)
*G01P 15/00* (2006.01)

(52) U.S. Cl. ................................... 73/12.01
(58) Field of Classification Search ............ 73/12.01; 68/131
See application file for complete search history.

(56) References Cited

U.S. PATENT DOCUMENTS

| 1,182,881 | A |   | 5/1916  | Frye |
| 1,639,743 | A | * | 8/1927  | Marscheider ........ 137/614.11 |
| 2,298,176 | A | * | 10/1942 | Schwartz ................. 403/77 |
| 2,614,437 | A |   | 10/1952 | Meggitt |
| 2,919,599 | A | * | 1/1960  | Milton et al. ........... 74/490.15 |
| 3,005,336 | A |   | 10/1961 | Wyman |
| 3,018,992 | A |   | 1/1962  | Lore |
| 3,303,742 | A | * | 2/1967  | Thierry et al. ............ 89/37.01 |
| 3,603,545 | A | * | 9/1971  | Boniface ................. 248/184.1 |
| 3,810,550 | A | * | 5/1974  | Longarzo .................. 211/69.6 |
| 3,811,047 | A | * | 5/1974  | Shragal ..................... 250/204 |
| 4,571,003 | A | * | 2/1986  | Roling et al. .............. 299/33 |
| 4,575,039 | A | * | 3/1986  | Persson et al. ............ 248/550 |
| 4,660,809 | A | * | 4/1987  | Langlitz et al. ............ 266/246 |
| 4,940,210 | A | * | 7/1990  | Gilmore ..................... 251/160 |
| 5,309,788 | A | * | 5/1994  | Summerfield ............ 74/568 R |
| 5,340,111 | A | * | 8/1994  | Froelich ..................... 473/279 |
| 5,820,478 | A | * | 10/1998 | Wood et al. ................ 473/279 |

(Continued)

FOREIGN PATENT DOCUMENTS

DE 296 18 149 1/1997

(Continued)

*Primary Examiner*—Edward Lefkowitz
*Assistant Examiner*—Octavia Davis
(74) *Attorney, Agent, or Firm*—Kenyon & Kenyon LLP

(57) ABSTRACT

A device for positioning a component part in an inclined position, having a mounting support unit which is accommodated in a support of a base for tilting about at least one axis of the component part, and having an actuator unit which tilts the mounting support unit at a specified angle of inclination about the at least one axis of the component part, the mounting support having at least one coupling element which is supported on at least one counter-support of the actuator unit, which is movable relative to the at least one coupling element, in order to position the mounting support unit with the component part in the inclined position.

10 Claims, 2 Drawing Sheets

U.S. PATENT DOCUMENTS 6,152,826 A * 11/2000 Profeta et al. .............. 464/159
6,246,047 B1 * 6/2001 Mikan ........................ 250/221
6,329,647 B1 * 12/2001 Mikan ........................ 250/221
6,663,498 B2 * 12/2003 Stipan ........................ 473/279

FOREIGN PATENT DOCUMENTS

FR    2 356 198    1/1978

* cited by examiner

DEVICE FOR POSITIONING A COMPONENT PART IN AN INCLINED POSITION AND IMPACT TEST STAND HAVING SUCH A DEVICE

BACKGROUND INFORMATION

Multiple mechanisms are known from practice with the aid of which a specified tilting of a component part about one or several predefined axes of this component part may be performed. Especially from the field of micropositioning technology, mounting fixtures are known such as hexapods, tiltable tables and tiltable platforms.

In addition, so-called flange aligners are known from vacuum technology.

In a hexapod mechanism, a platform, on which the component part is fixed, is inclined into the specified position in that the linear and rotative spatial motions of the platform take place using six axes or rods that are adjustable in their length, that engage with the platform. This makes six degrees of freedom available, each position that may be assumed by the platform corresponding to a specific combination of the six axes. By simultaneous control of all six axes, any number of spatial motion results of the platform, and the component part fastened to it, may be achieved.

Such a six-axes device is known, for example, from German Patent No. DE 296 18 149 U1.

Tilting tables function according to a similar principle as is used in hexapods, a difference being that, as a rule, only two degrees of freedom may be managed, that are determined by two axes which are resident in the tilting table itself, and about which the tilting table may be tilted.

All these mounting supports and tables for tilting component parts known from positioning technology have the disadvantage in common that they are only conditionally or not at all applicable where high dynamic and static loads are exerted on the component part, such as in material testing technology or in the case of electric tools. Their construction and design make possible only a very slight rigidity and durability compared to cyclical loading in any axial direction, using high maximal forces. Just as problematical is a change in the position of the component part axis set under cyclical loading.

Starting from that, an object of the present invention is to provide a device for positioning a component part in an inclined position and an impact test stand which may be exposed to such loads without a problem, without the precision of the positioning of the component parts being impaired thereby.

SUMMARY OF THE INVENTION

The object is attained by a device according to the present invention as well as by having such a device as a mounting support for an impact test stand having a test sample, according to the present invention.

The device according to the present invention provides that a mounting support unit, which is held in a support for tilting about at least one axis of the component part, is in contact with an actuator unit that tilts the mounting support unit at a specified angle of inclination about this one axis of the component part, using at least one coupling element that uses the actuator unit itself as a counter-support Because of the fact that this counter-support is movable relative to the coupling element, the mounting support, having the component part, may be positioned in the appropriate inclined position.

As a result, an important aspect of the present invention lies in a decoupling of the component part mounting support and the actual tilting unit. It is thereby possible to support a component part, such as a sample to be tested, very rigidly and resistant to durable impact stress or other such load change, and to tilt it very precisely in the desired manner before such a stress, which may be a continuous test stress.

In one advantageous specific embodiment of the present invention, the mounting support element may be developed essentially at least in the shape of a sphere segment, and particularly as a ball (sphere) which is supported movably in a ball socket of the same radius.

Because of the exclusively planar support of the ball in the ball socket, a firm support may be achieved, the ball being able to be moved at the same time into an inclined position which comes about from a combined tilting about respectively two spatial axes that cross each other.

According to one advantageous specific embodiment of a device according to the present invention, the at least one coupling element is formed from two lugs that project from the ball and are axially opposite to each other.

In turn, these lugs are advantageously supported on an axial end face of a ring which at least partially encloses the ball. The ball is then used as counter-support for the lugs, and preferably has on its axial end face a particularly ground, especially conically formed surface on which the lugs run if the ring, which is rotatably supported within a base of the device that contains the support of the mounting support, is rotated.

In one particularly advantageous specific embodiment of the device according to the present invention, a second coupling element is provided at the ball, in the form of additional lugs, which are also axially opposite to each other, and which are offset from the first lugs by 90°.

In a corresponding way, as was mentioned above, advantageously a second ring, which is situated concentrically to the first ring, forms the rigid counter-support for the second lugs. Expediently, on its axial, or upper end face in the installed state, there is also provided a specially ground, preferably conically formed surface, on which the second lugs come to lie if the second ring is rotated.

Both rings expediently run concentrically around the ball and are rotatable in two directions, independently of each other.

It should be understood that, by rotating the rings, the respective lugs are lifted. Based on the fact, however, that the ball is supported exclusively rotatably in the ball socket, the area of the ball that is open towards the upper side, in which an accommodating unit for a component part or a sample is provided, becomes correspondingly inclined in its alignment.

By using four lugs, which are as if cruciformly set into the ball, and which run on the special respective end faces of the two concentrically situated rings, by turning the rings, one may achieve a tilting motion of the ball that may be very finely set. If respectively two opposite lugs rest upon one ring, the axis of the component part may be tilted independently in two spatial directions offset by 90°. In this way, any desired spatial angle deviation, that is smaller than the constructively predefined maximum angle, may be set with a high precision of at least 0.1°.

It becomes clear that, by an appropriate selection of material for the ball, the ball socket as well as the accommodation unit that is accommodated in the ball, one may implement a most rigid and resistive mounting support device, which, at the same time, ensures great precision in angular positioning, because of the kinematics for tilting the ball and the component part that is nevertheless implemented in a very simple manner in this context.

Thus, according to the present invention, it is provided that one may integrate such a developed device especially as mounting support for a test sample in an impact test stand, in which, as is well known, high dynamic loads are transmitted by the component part to the mounting support unit, and thereby via the support to the actuator unit.

In one advantageous specific embodiment of the present invention, in an upper section of the mounting support unit or the ball a socket is provided which is able to accommodate a standardized, exchangeable accommodation unit, so that in each case component parts having different dimensions may be submitted to an appropriate test in one and the same device.

The exchangeable accommodation unit may be clamped by a flange and appropriate chucking fixtures to the upper side of the ball, and fixed in a manner safe from being lost.

If the ball is fixed on its upper side using a flange that has an appropriately concavely formed countour on its inner side facing the ball surface, an appropriately stable support of the ball may be achieved by clamping this flange, using appropriate chucking fixtures, to a base that has the ball socket at its center. Between the flange and the base having the ball socket, one should provide sufficient free space so that the lugs may move appropriately when the rings are rotated.

DETAILED DESCRIPTION

Figure 1:
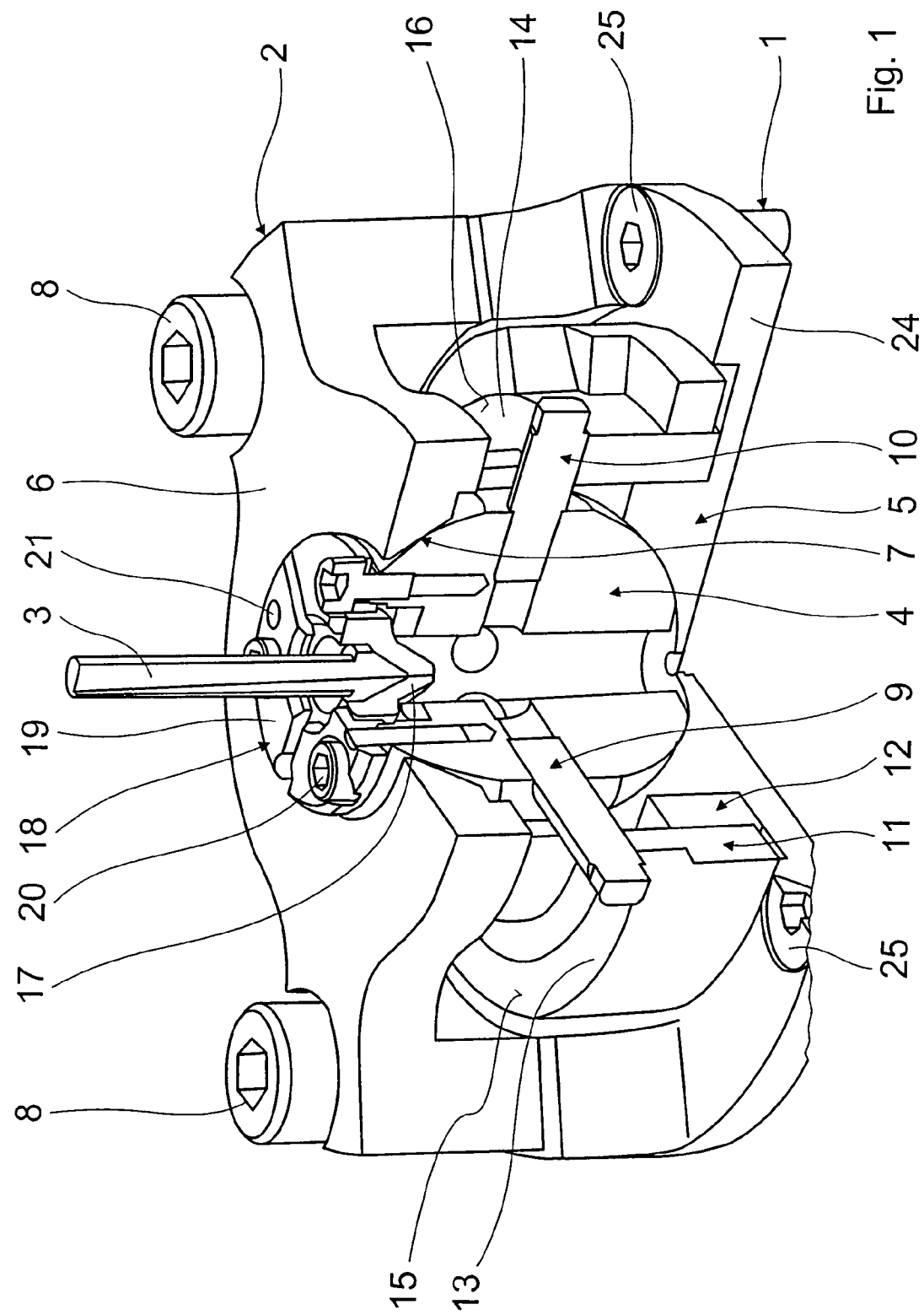
FIG. 1 shows a perspective, schematic view of a device for the mounting support of a component part in an impact test stand, according to the present invention, in partial section

FIG. 1 illustrates an impact test stand 1 having a device 2 for positioning a component part in an inclined position in a perspective, schematic representation.

Device 2 for positioning a component part 17 in an inclined position is made up essentially of a mounting support 4 for component part 17, a valve seat in the presently shown example, and a support 5, in which mounting support 4, for tilting about at least one axis of component part 3, is accommodated. For the further illustration, the impacting component part 3, by which the stressing of component part 17 is carried out, is also taken up into the schematic representation.

In the example shown, the mounting support unit is formed as a ball 4, which is supported in a ball socket forming support 5. In this context, ball socket 5 forms an integral part of a base 24.

Base 24 of device 2 may be fastened via appropriate chucking means 25 to a suitable test apparatus.

In the installed position, ball 4 is held in ball socket 5 from above, using a flange 6. In this context, flange 6 has on its inside facing the ball surface a concavely formed surface 7, so that ball 4 is supported within device 2 in an only rotatively moving manner. Flange 6 is fixed to base 24 via chucking means 8.

Ball 4 has two coupling elements in the form of lugs 9 and 10. Lugs 9 and 10 are fitted into accommodating channels formed in ball 4, respectively in a cruciform manner and parallel to base 24, for instance, using a press fit, as may be seen in the sectional representation in FIG. 1. Instead of a press fit, alternatively a screw-in joint may also be provided.

Figure 3:
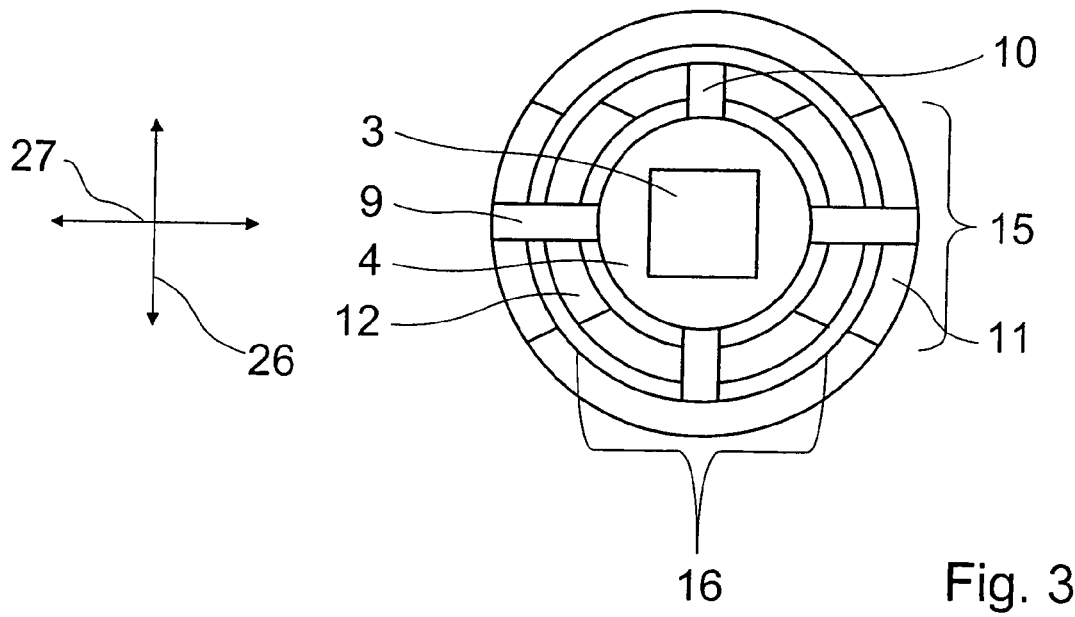
FIG. 3 shows, in a top view, a schematic representation of the arrangement of the rings for performing the individual tilting directions of the device of FIGS. 1, 2a and 2b.

Consequently, in the installed position, lugs 9 and 10 extend directed radially outwards, away from the side of ball 4, and are in each case aligned opposite to one another, as may be seen in the top view of FIG. 3.

At their end projecting from ball 4, first lugs 9 lie on a first outer ring 11 that surrounds ball 4, which forms the counter-support for these lugs 9.

In a corresponding manner, second lugs 10 lie upon a second ring 12 that is situated radially within first ring 11 and bordering on it, and which consequently forms an inner ring.

Both rings 11 and 12, which form an actuator unit for the mounting support unit with ball 4, are arranged concentrically with each other, and supported rotatably within base 24.

Figure 2A:
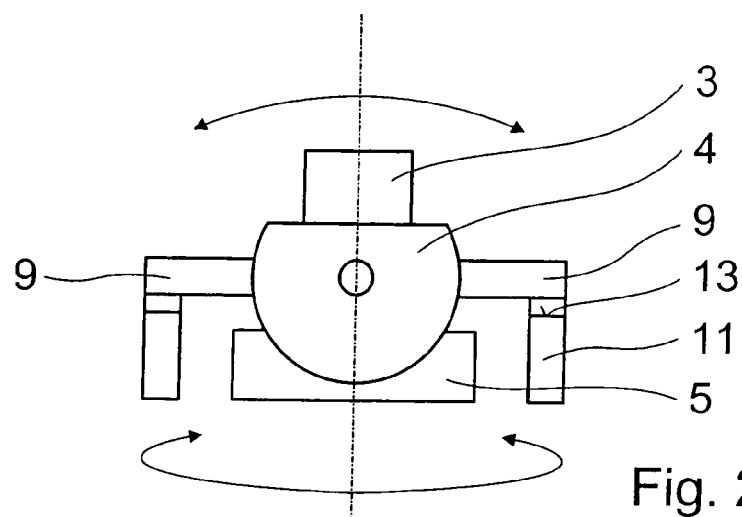
FIG. 2a shows a schematic basic representation of the movability of the device in FIG. 1 by a first ring.
Figure 2B:
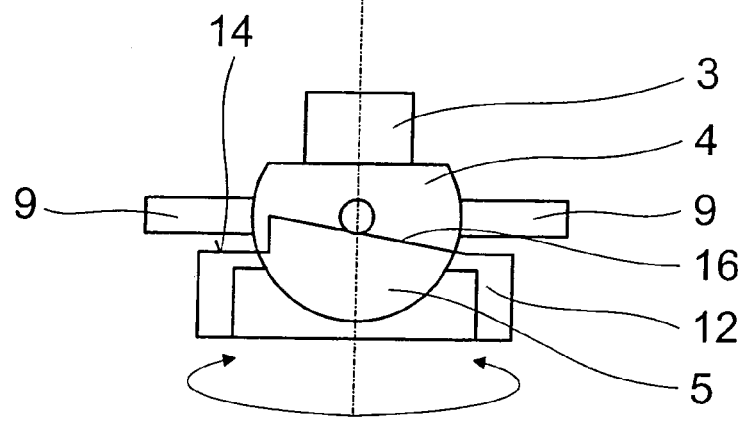
FIG. 2b shows a schematic basic representation of the movability of the device in FIG. 1 by a second ring.

As may be seen in each case in FIGS. 2a, 2b and the top view in FIG. 3, rings 11 and 12 have on their respective end faces 13 and 14, in each case, adjustedly formed conical surface sections 15 and 16, on which the assigned lugs 9 and 10 glide when rings 11 and 12 are rotated.

Based on the fact that lugs 9 and 10 are firmly inserted in ball 4, and ball 4 itself, because of the stress from flange 6, is not able to move linearly along any direction in space, turning respective rings 11 and 12 has the effect that conical surfaces 15 and 16 are rotated underneath respective lugs 9 and 10, whereby lugs 9 and 10 are lifted up or lowered, and a purposeful rotative motion of ball 4 is effected within the support, so that component part 17, that is to be held, becomes positioned in an appropriate inclined position.

In FIG. 3, an arrow 26 indicates a possible tilting direction of inner ring 12 for the embodiment shown, and an arrow 27 indicates a possible tilting direction of outer ring 11 for the embodiment shown.

It becomes clear that, because of the corresponding embodiment of formed surfaces 15 and 16 on end faces 13 and 14 of rings 11 and 12, and via the extent of the rotation, any corresponding inclination or tilting of ball 4 is able to be generated.

Since the two lugs 9 are assigned to outer ring 11 and the two lugs 10, positioned at right angles to lugs 9 are assigned to outer ring 12, via a combination of tilting about two different axes in space one is able to perform an appropriate inclination of component part 17 as a combined tilting about two axes of this component part 17.

Now, on the upper side of ball 4 a socket is developed which makes possible the accommodation of various component parts.

Component part 17 is fixed to the upper side of ball 4 using chucking means 20, centering pins 21 being of assistance in the centering of flange 19.

Based on the construction and the kinematically simple activation via a relative motion of rings 11 and 12 with respect to lugs 9 and 10 of ball 4, in such devices, materials may be used for the individual components which demonstrate an extreme rigidity and impact strength as well as durability with respect to dynamic stresses, so that a device according to the present invention is particularly suitable for application in an impact test stand.

An additional field of application in which a device according to the present invention may be exposed to a similar stress, and in which such a device has its described advantages, is represented by the field of electric tools.

What is claimed is:

1. A device for positioning a component part in an inclined position, comprising:

a base;

a mounting support, which is accommodated in a support of the base for tilting about at least one axis of the component part, the mounting support including a ball which is movably accommodated in a ball socket that forms the support; and an actuator unit which tilts the mounting support at a specified angle of inclination about the at least one axis of the component part, the mounting support having at least one coupling element which is (a) formed of two lugs which extend from the ball axially opposite each other and (b) supported on at least one counter-support of the actuator unit, which is movable relative to the at least one coupling element, in order to position the mounting support with the component part in the inclined position.

2. The device according to claim 1, wherein the at least one counter-support is formed of a ring which surrounds the ball and upon whose axial end face the lugs come to lie.

3. The device according to claim 2, wherein the ring is rotatable and on its axial end face has at least in parts a conically formed surface, upon which the lugs come to lie during a rotation of the ring.

4. The device according to claim 3, further comprising a further ring situated concentrically about the ring, and wherein the at least one coupling element includes a second coupling element in the form of two second lugs which extend from the ball axially opposite to each other and are offset by 90° with respect to the lugs of a first of the least one coupling element, the further ring being rotatable and on its axial end face having at least in parts a conically formed surface, on which the second lugs come to lie during a rotation of the further ring.

5. The device according to claim 4, wherein both the rings are simultaneously rotatable in a specified manner, in order to position the ball with the component part in an inclined position that is determined by a tilting about two axes of the component part.

6. The device according to claim 1, wherein the mounting support has a flexible socket for accommodating various component parts.

7. The device according to claim 6, further comprising a flange for clamping the component part together with the mounting support.

8. The device according to claim 1, further comprising a flange clamped together with the base, in order to accommodate the mounting support between the flange and the base in a movable manner.

9. An impact test stand comprising a device for positioning a component part in an inclined position, as a mounting support for a test specimen, the device including:

a base;

a mounting support, which is accommodated in a support of the base for tilting about at least one axis of the component part, the mounting support including a ball which is movably accommodated in a ball socket that forms the support; and an actuator unit which tilts the mounting support at a specified angle of inclination about the at least one axis of the component part, the mounting support having at least one coupling element which is (a) formed of two lugs which extend from the ball axially opposite each other and (b) supported on at least one counter-support of the actuator unit, which is movable relative to the at least one coupling element, in order to position the mounting support with the component part in the inclined position.

10. The device according to claim 9, wherein the actuator unit tilts the mounting support about an axis that is substantially at a right angle to the axis of the lugs of the at least one coupling element.

* * * * *